United States Patent [19]

Harter

[11] 4,125,127
[45] Nov. 14, 1978

[54] PISTON TYPE FLUID PRESSURE VALVE

[75] Inventor: James B. Harter, Tempe, Ariz.

[73] Assignee: The Garrett Corporation, Los Angeles, Calif.

[21] Appl. No.: 796,277

[22] Filed: May 12, 1977

[51] Int. Cl.² .............................................. F16K 17/04
[52] U.S. Cl. ..................................... 137/494; 137/859; 251/DIG. 2
[58] Field of Search ..................... 137/494, 859, 14; 251/DIG. 2

[56] References Cited

U.S. PATENT DOCUMENTS

| 2,720,378 | 10/1955 | Otto | 251/DIG. 2 |
| 3,070,108 | 12/1962 | Fischer | 251/DIG. 2 |
| 3,766,933 | 10/1973 | Nicholson | 251/DIG. 2 |

Primary Examiner—Robert G. Nilson
Attorney, Agent, or Firm—James W. McFarland; Albert J. Miller

[57] ABSTRACT

A translating piston, fluid pressure valve which utilizes a convoluted, elastomeric diaphragm member both to seal a high pressure area and to selectively control exhaust of pressurized fluid therefrom upon movement of the piston of the valve.

5 Claims, 4 Drawing Figures

PISTON TYPE FLUID PRESSURE VALVE

BACKGROUND OF THE INVENTION

This invention relates to pressure regulating devices, and relates more particularly to an improved valve for limiting maximum pressure in a fluid carrying duct without utilization of a poppet-seal configuration.

Pressure regulators such as a pneumatic bleed off valve which functions to limit maximum pressure and/or maintain a constant pressure in a fluid carrying duct, are many times subject to premature failure due to erosion, wear, or deterioration at the valving surface. For instance, high pressure valves of the type referred to normally incorporate a poppet seat arrangement which includes a spring loaded poppet that is urged into direct, sealing contact with a seat. To reduce wear and deterioration of such seat, it has been proposed previously to utilize an elastomeric or other somewhat deformable material on the seat to insure good sealing action. Regardless of the material constituting the seat, it is common that malfunction of the valve can in many cases be traced to the direct contact between the valve seat and the poppet seat. Sliding type valves of the prior art inherently require extremely expensive machining and/or treatment to obtain close tolerances and effective sealing between sliding rather than impacting surfaces.

Exemplarly of prior arrangements are the structures shown in U.S. Pat. Nos. 2,416,855; 3,103,949; 3,282,288; 3,690,344; and 3,926,211, none of which contemplate the improvements and advantages of the present invention.

SUMMARY OF THE INVENTION

It is an important object of the present invention to provide an improved pressure regulator of the type referred to which does not utilize a poppet seat arrangement for sealing, and which exhibits improved wear and longevity characteristics.

More particularly, it is an important object of the present invention to provide improved method and apparatus for a bleed off type, high pressure regulator which utilizes an external, convoluted, elastomeric diaphragm to accomplish both sealing and valving functions in a piston type pressure regulator valve.

Another important object of the present invention is to provide a pressure regulator of the class described in extremely compact, economical configuration by virtue of inclusion of a centrally arranged, movable piston having cross ducts therein extending to the external surfaces of the piston. Additionally, the invention contemplates utilization of a convoluted diaphragm disposed on the exterior of such piston with a portion of the diaphragm in covering relationship to the cross duct in the piston to control fluid flow therethrough.

Yet another very important object of the present invention is to provide such a pressure regulator and method as set forth in the previous paragraphs, wherein the convoluted diaphragm is so arranged such that the portion which overlies the cross ducts in the movable piston are always pressure balanced in order to avoid extrusion of the elastomeric diaphragm.

These and other more particular objects and advantages of the present invention are specifically set forth in or will become apparent from the following detailed description of the preferred embodiment of the invention, when read in conjunction with the accompanying drawing.

BRIEF DESCRIPTION OF THE DRAWING

FIG. 2 is a fragmentary view of a portion of the bleed off pressure regulator in the flow-relieving position thereof;

DETAILED DESCRIPTION OF THE PREFERRED EMBODIMENT

Figure 1:
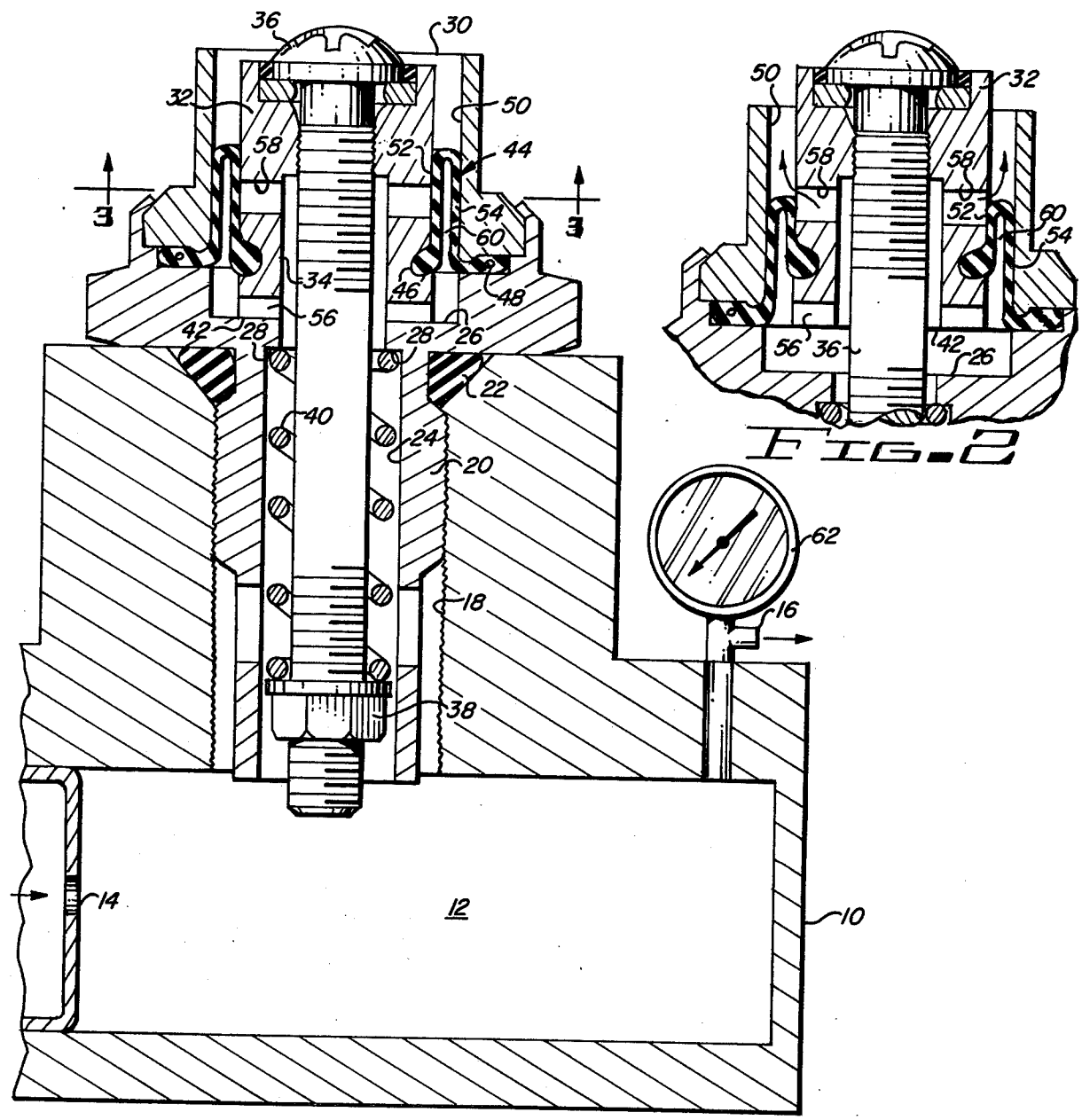
FIG. 1 is an elevational cross sectional view of a pressure bleed off regulator as contemplated by the present invention.
Figure 3:
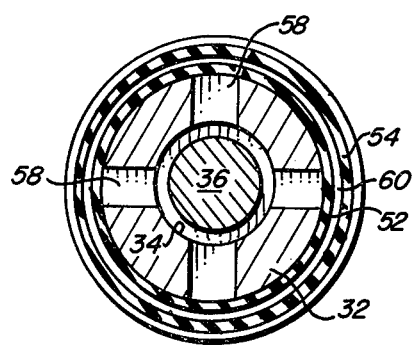
FIG. 3 is a plan cross sectional view taken along lines 3—3 of FIG. 1.
Figure 4:
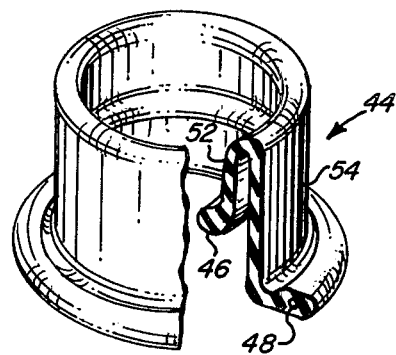
FIG. 4 is a perspective view of the elastomeric sealing diaphragm.

Referring now more particularly to the drawing, FIG. 1 illustrates a portion of a pneumatic fluid flow system and includes a housing 10 having an internal fluid pressure carrying duct 12, an upstream orifice 14, and a downstream exhaust 16. Housing 10 further includes an elongated passage 18 which receives a threaded sleeve 20 mounted in sealing relationship by O-ring 22. Sleeve 20 includes an internal, through passage 24 of stepped diameter defining first and second shoulders 26 and 28. Shoulder 28 faces pressure duct 12 while shoulder 26 faces an exhaust port 30 formed at the outer end of sleeve 20.

Loosely mounted within central through passage 24 is a piston member assembly including an upper piston head having a central through passage 34 therein, and a bolt 36 threadably secured to head 32 and sealingly closing the upper or outer end thereof. At its lower end intermediate duct 12 and shoulder 28, bolt 36 carries a stop shown in a form of a nut 38 disposed in spaced, facing relationship to shoulder 28. Biasing means in the form of a helical coil compression spring 40 extends between shoulder 28 and stop nut 38 to urge the nut 36 and piston head 32 in a downward direction with a lower face 42 of head 32 in contacting relationship with shoulder 26 to limit inward travel of the piston assembly.

The piston assembly further includes a convoluted, elastomeric diaphragm 44 having opposite inner and outer circular ends 46, 48 respectively secured to piston head 32 and the sleeve assembly 20. Diaphragm 44 is arranged with its convoluted central fold disposed within an annular space defined between the outer surface of circular piston head 32 and the internal surface portion 50 of sleeve central through opening 24. An inner wall 52 of diaphragm 44 lies in contacting relationship with the outer surface of piston head 32 while an outer wall 54 of the diaphragm lies in contact with the inner surface 50 of sleeve 20.

Piston head 32 further includes two sets of cross ducts, a first set 56 disposed at the lower face of piston head 32 which engages the shoulder 26, and a second set of intermediately located cross ducts 58 communicating with the central passage 34 of piston head 32 and located such that the inner circular end 46 of diaphragm 44 is disposed between the two sets of cross ducts 56 and 58.

It is important to note that the overall configuration of the valve allows continuous fluid communication from the high pressure duct 12 through central passage 24, cross ducts 56 and into the annular space defined between the piston head 32 and the sleeve 20. Thus the central internal portion 60 of the convoluted diaphragm is in continuous communication with pressure duct 12.

In operation, pressurized pneumatic gas flow is carried in pressure duct 12 from an upstream section to a downstream exhaust 16. Orifice 14 controls and limits the rate of fluid flow therethrough. The pressure regulator valve operates and maintains substantially constant pressure at the downstream exhaust 16 as may be measured by a gauge 62. More particularly, pressure of fluid in duct 12 acts upon the piston assembly to urge the latter in an upward direction against the bias of spring 40. Cross ducts 56 assure continuous communication of the internal zone 60 of the convoluted diaphragm with the pressure duct 12. Further, pressurized fluid from duct 12 is communicated through central pasage 34 and the other set of cross ducts 58 to act against the portion of inner wall 52 which overlies the cross ducts 58. In this manner it will be seen that the portion of the elastomeric diaphragm which overlies cross ducts 58 is subject to equal pressure on both sides to prevent extrusion into the cross ducts 58.

In the position illustrated in FIG. 1, pressure of fluid in duct 12 is insufficient to overcome the urging of spring 40 which forces piston head 32 downwardly with its lower face in engagement with shoulder 26. A portion of inner wall 52 of the diaphragm overlies the cross ducts 58 and thus prevents communication from duct 12 through cross ducts 58 to exhaust ports 30. The portion of inner wall 44 above cross ducts 58 sealingly contacts the outer surface of piston head 32 to positively seal against fluid leakage from pressure duct 12. At the same time however it is noted that the portion of inner wall 52 which overlies the cross ducts 58 remains pressure balanced.

As pressure in duct 12 gradually increases, the urgings of spring 40 will ultimately be overcome and the piston assembly will be shifted upwardly towards the FIG. 2 position. Because the inner and outer ends 46, 48 of the diaphragm are respectively secured to the moving piston and stationary sleeve, the diaphragm rolls with piston movement causing reduction in the length of the inner wall portion 52 and attendant increase in the length of outer wall portion 54. With continued upward piston movement, cross ducts 58 are ultimately uncovered to permit fluid bleed off and exhaust from pressure duct 12 through internal passages 24, 34 and cross ducts 58 to exhaust port 30. Even with the cross ducts 58 partially uncovered as illustrated in FIG. 2, the portion of the inner wall 52 which remains in covering relationship with the cross ducts 58 still is in pressure balanced relationship to prevent extrusion of the diaphragm into cross ducts 58. It will be apparent to those skilled in the art that the piston assembly is moved automatically in response to changes in pressure in duct 12 to regulate bleed off therefrom through cross duct 58 in order to maintain a substantially constant, maximum pressure within pressure duct 12.

Thus the present invention provides an improved bleed off type pressure regulator which does not utilize a contacting poppet and seat configuration. Rather, the only contacting surfaces subject to impact in the structure illustrated are the lower face of poppet head 32 and shoulder 26. However, these surfaces do no valving or sealing functions and, in contrast, actually include cross ducts 56 to assure continuous communication thereacross. Any wear or erosion of the two impacting surfaces have no substantial effect on the life of the bleed off regulator valve. At the same time the elastomeric diaphragm performs both sealing and valving, but the portion which overlies the cross ducts 58 is substantially pressure balanced at all times to avoid extrusion and destruction of the diaphragm. Because the structure includes no close, critical tolerances, it is economical to manufacture, highly vibration and wear resistant, and capable of withstanding greater contamination.

From the foregoing it will also be apparent that the present invention provides an improved method of regulating pressure in a duct 12 by including a piston assembly having central opening 34 therein communicating with pressure duct 12, and cross ducts 58 extending to the outer surface of the centrally disposed piston. Placing the elastomeric, convoluted diaphragm 44 on the external wall of the centrally located piston allows the diaphragm to both seal and to act as a valving member in covering and uncovering the cross duct upon movement of the piston assembly. The method further contemplates the step of maintaining the portion of the convoluted diaphragm which overlies the cross ducts 58 in pressure balanced relationship at all times and in all positions of the assembly to avoid extrusion and wear on the elastomeric diaphragm.

The foregoing detailed description of a preferred embodiment of the present invention should be considered exemplary in nature and not as limiting to the scope and spirit of the invention as set forth in the appended claims.

Having described the invention with sufficient clarity that those skilled in the art may make and use it, I claim:

1. A fluid pressure control valve comprising:

a housing having a high pressure fluid duct, a low pressure exhaust port, and a passage interconnecting said duct and port;

a sleeve secured to said housing in said passage, said sleeve having a central passage and first and second internal shoulders respectively facing said pressure duct and exhaust port;

a piston head loosely disposed in said central passage of the sleeve to define an annular space between said piston head and the internal surface of the sleeve, said piston head having a lower face contactable with said second shoulder to limit inward movement of said piston head toward said pressure duct, said head having a central opening and cross ducts at said lower face and at an intermediate location;

a bolt threadably received in and closing the outer end of said central opening of the piston head, said bolt having a stop disposed in spaced, facing relationship to said second shoulder, said piston and bolt arranged whereby said annular space is in continuous communication with said pressure duct through said cross ducts at said lower face;

a helical coil compression spring extending between said stop and said first shoulder for urging said piston head inwardly toward said pressure duct; and a convoluted diaphragm disposed in said annular space with inner and outer circular ends respectively secured to said piston head and said sleeve to seal said annular space from said exhaust port, said convoluted configuration of the diaphragm defining inner and outer parallel walls respectively in contact with the outer surface of said piston head and said internal surface of the sleeve, a portion of said inner wall overlying said intermediately located cross ducts for controlling fluid communication between said pressure duct and said exhaust port through said intermediately located cross ducts as said piston head moves relative to said diaphragm.

2. A fluid pressure valve comprising:

a housing having an internal space for carrying pressurized fluid and a low pressure exhaust duct;

a piston member movable relative to said housing and exposed to pressurized fluid in said pressure duct, said piston having an internal duct for selectively interconnecting said pressure duct with said exhaust port;

an elastomeric, flexible, convoluted diaphragm arranged with a portion overlying said internal duct to control fluid communication therethrough, said portion being arranged in pressure balanced relationship to prevent extrusion of said diaphragm at said internal duct, said piston movable relative to said diaphragm to selectively cover and uncover said internal duct;

said piston member comprising a piston head having a central bore communicating with said pressure duct and said internal duct, and a bolt secured to and closing an outer face of said piston head, said bolt carrying a stop spaced inwardly from and in facing relationship to a shoulder on said housing; and spring means extending between said stop and said shoulder for urging said piston member to move in a direction toward a location wherein said diaphragm covers said internal duct, the pressure of fluid in said pressure duct urging said piston member in an opposite direction for uncovering said internal duct and allowing fluid communication between said pressure duct and exhaust port.

3. A valve as set forth in claim 2, wherein said diaphragm includes inner and outer circular ends respectively secured to said piston member and said housing, said piston member being arranged within an internal passage of the housing such that the external surface of said piston member is spaced from the wall of said internal passage to define an annular space therebetween, said diaphragm disposed in said annular space, said internal duct comprising a set of cross ducts in said piston head opening into said annular space.

4. A valve as set forth in claim 3, wherein said diaphragm is arranged with inner and outer parallel walls respectively in contact with said external surface of the piston member and said wall of the internal passage of said housing, said portion of the diaphragm being a portion of said inner wall of the diaphragm.

5. A fluid pressure valve comprising:

a housing having an internal space for carrying pressurized fluid and a low pressure exhaust duct;

a piston member movable relative to said housing and exposed to pressurized fluid in said pressure duct, said piston having an internal duct for selectively interconnecting said pressure duct with said exhaust port;

an elastomeric, flexible, convoluted diaphragm arranged with a piston overlying said internal duct to control fluid communication therethrough, said portion being arranged in pressure balanced relationship to prevent extrusion of said diaphragm at said internal duct, said piston movable relative to said diaphragm to selectively cover and uncover said internal duct;

spring means urging the piston member to move in a direction toward a location wherein said diaphragm covers said internal duct, the pressure of fluid in said pressure duct urging said piston member in an opposite direction for uncovering said internal duct and allowing fluid communication between said pressure duct and exhaust port;

said diaphragm including inner and outer circular ends respectively secured to said piston member and said housing, said piston member being arranged within an internal passage of the housing such that the external surface of said piston member is spaced from the wall of said internal passage to define an annular space therebetween, said diaphragm disposed in said annular space, said internal duct comprising a set of cross ducts in said piston member opening into said annular space, said diaphragm arranged with inner and outer parallel walls respectively in contact with said external surface of the piston member and said wall of the internal passage of said housing, said portion of the diaphragm being a portion of said inner wall of the diaphragm, said piston member comprising an annular piston head having a central passage open to said pressure duct, said set of cross ducts extending between and communicating said central passage of the piston head with said annular space, said piston head having a lower face engageable with a shoulder on said housing to limit inward travel of the piston head, said piston head further including a second set of cross ducts at said lower face for communicating said annular space with said pressure duct at all times, said diaphragm sealing said annular space from said exhaust duct, said piston member further including a bolt secured to and closing an outer face of said piston head, said bolt carrying a stop spaced inwardly from and in facing relationship to a second shoulder on said housing, said spring means extending between said stop and said second shoulder.

* * * * *